Aug. 16, 1938. D. H. DAWSON ET AL 2,127,247
PREPARATION OF COMPOUNDS OF TITANIUM
Filed June 15, 1935
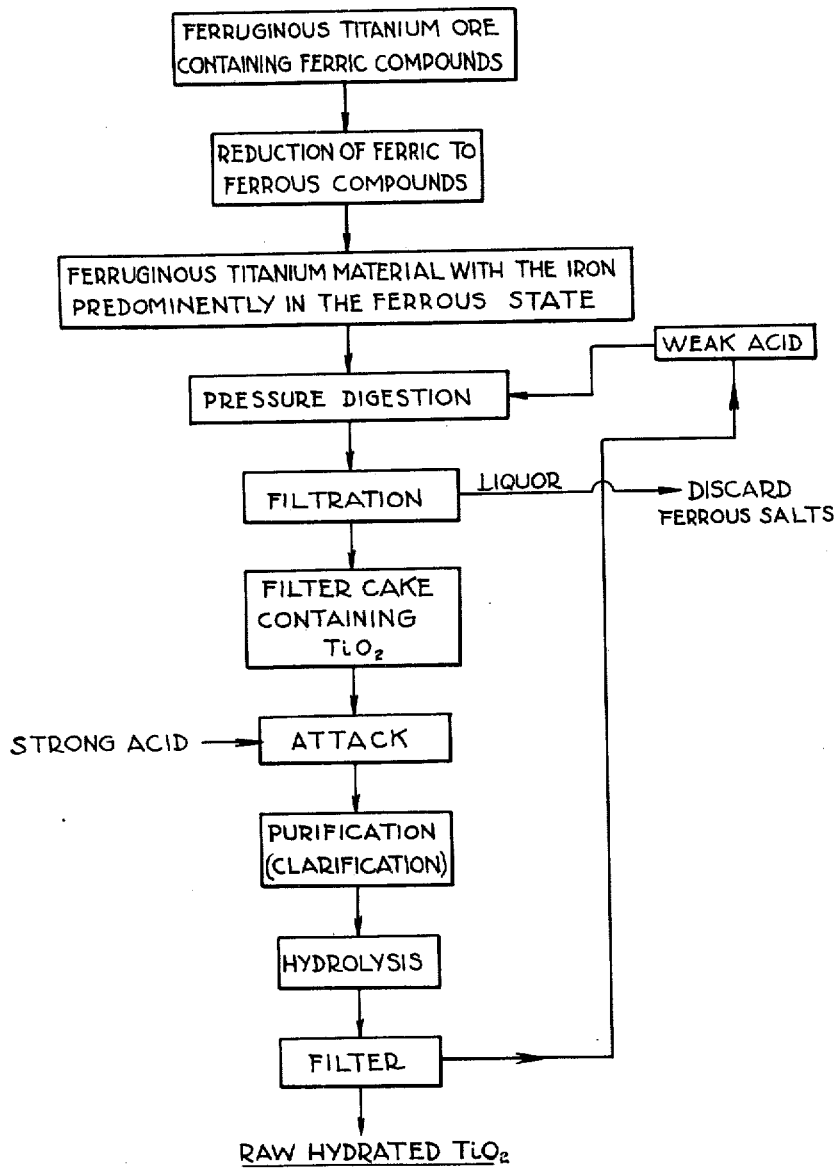

Patented Aug. 16, 1938

2,127,247

UNITED STATES PATENT OFFICE 2,127,247

PREPARATION OF COMPOUNDS OF TITANIUM

David H. Dawson, East Orange, N. J., and Ignace J. Krchma, Brooklyn, and Robert M. McKinney, Linthicum Heights, Md., assignors, by mesne assignments, to E. I. du Pont de Nemours and Company, a corporation of Delaware Application June 15, 1935, Serial No. 26,790

19 Claims. (Cl. 23—202)

The present invention relates to a novel process of producing compounds of titanium from ferruginous titanium ores and comprises in its broadest embodiment the steps of reducing ferric compounds present in the ore to ferrous compounds and subsequently eliminating ferrous compounds from said reduced ores prior to putting into solution the titanium values of said ores. We obtain in this manner a material which contains the titanium values of the ore in a much more concentrated form.

One of the customary processes of recovering titanium values from ferruginous titanium ores is to dissolve in acid both the titanium and iron values of the ore, then to separate the majority of the iron from the solution and then treat the solution to precipitate a titanium compound therefrom.

In another proposed process it has been suggested to reduce the iron contained in the ore to the metallic state, to mechanically separate the metallic iron and then to dissolve the remaining titanium values in acid.

Both these procedures entail various difficulties. In the first type of operations it is found that the removal of the iron from a solution containing both iron and titanium is rather expensive and is never complete. Another difficulty is that known separation processes are only operative with sulfuric acid solutions and there is no known means whereby titanium could practically be separated from iron in other than sulfuric, for instance hydrochloric acid solutions.

So far as we know there is no commercial application of the processes which is based upon the separation of the iron in the metallic form from the titanium. One of the main difficulties in this instance resides in the fact that the reduction of the iron compound to the metallic state requires temperatures of about 1000° C. and above, at which the titanium compounds in the ore are so modified that they become substantially insoluble in sulfuric acid.

We avoid these difficulties by our novel process which consists in two main, dependent steps.

We first treat the ferruginous titanium ore with a suitable reducing agent at relatively lower temperatures, namely substantially below 800° C. whereby all ferric compounds in the ore are reduced to ferrous compounds without formation of metallic iron and whereby the titanium compounds are so affected that they become substantially insoluble in acids under conditions where the ferrous compounds are soluble, the titanium compounds, however, not being affected to such a point that they would become insoluble under conditions where ferric compounds would be soluble.

The attached drawing shows a flow sheet of our complete novel process and includes some preferred operations which we found useful in the second step of the process.

In the specific embodiments of our invention we subject a titaniferous ore containing ferric iron, such as ilmenite to a heat treatment at relatively low temperature, substantially below 800° C., and in the presence of a suitable reducing agent. The ferric oxide present in the ore is completely reduced to the ferrous form without substantial formation of metallic iron.

Under these conditions the titanium values become difficulty soluble under conditions where the ferrous compounds produced are soluble, on the other hand the titanium values remain soluble under conditions where the ferric compounds in the original ore would also be soluble.

The reduced ore containing $TiO_2$ and FeO is then treated in the second step with acid to either dissolve all titanium and iron values or under such conditions where the ferrous compounds only are soluble.

Dilute solutions of strong mineral acids dissolve the ferrous compounds in ore treated according to our first step much easier than the titanium values or any ferric compounds which may not have been reduced. Temperatures above the boiling point at atmospheric pressure of the dilute acid and pressures above atmospheric so influence the preferential action of said acids for dissolving the ferrous compounds that it is possible to dissolve the greater part, if not all the ferrous compounds, while leaving most of the ferric and titanium compounds undissolved.

Dilute hydrochloric and dilute sulfuric, acids are practically the only strong mineral acids available for the second step of our novel process.

We prefer to use non-oxidizing conditions in the digestion step and prefer also to use acids which do not form insoluble iron and/or titanium salts.

The following is a detailed description of various embodiments of operations to be performed in the application of our invention:

The titaniferous raw material, such as ilmenite, that is to be reduced, may be treated either in a coarse, sandy state, (40–120 mesh) as it is frequently found in nature, or in a fine form, after a preliminary grinding, to say 200 mesh, with equally good results. The ilmenite ore is then passed through a rotating kiln where it comes into direct contact with a suitable reducing gas such as $H_2$, CO, $CH_4$, or the vapors of higher hydrocarbons such as are found in fuel oil.

This reduction was accomplished by us, for instance, by feeding the ilmenite, to a kiln approximately 6 inches in diameter and 10 ft. long. The middle section was heated externally in order to control the temperature accurately and conveniently. The reducing gas flowed continuously through the kiln counter-currently to the ilmenite. The reduction of the ferric iron in ilmenite could also be done satisfactorily in an internally fired rotary kiln with maintenance of a reducing atmosphere. Although it is desirable, in order to take full advantage of the results of our invention, to reduce substantially all of the ferric iron to the ferrous state, the reduction may be conducted in such a manner as to reduce only a major part of the ferric iron, and still retain most of the advantages.

The reduction of the ferric oxide starts to take place around 550° C. and proceeds at a rapid rate with high conversion of the reducing material. We prefer to maintain the reducing temperature below 800° C. as at around 950° C. the ferrous iron will be further reduced to the metallic state and the resulting material will be much less amenable to reaction with sulfuric acid. The rate of the ilmenite feed, whether coarse or fine, depends on the size of the equipment used and the required retention time necessary for obtaining economical and complete conversion of all ferric to ferrous iron.

To illustrate the effect of temperature during reduction upon the solubility of the titanium a sample of the reduced ore was then decomposed with 80% sulfuric acid. 75% of the $TiO_2$ content was converted to the soluble form. When unreduced ground ilmenite was treated in the same manner, 76% of the $TiO_2$ was converted to the soluble form. It is clearly evident from this that the partial reduction of ferric iron at low temperatures did not increase the difficulty of decomposition with sulfuric acid as is the case when higher temperatures (above 800° C.) are employed.

To compare this with the solubility of the titanium compound in untreated ore, a sample of ground ilmenite containing 60% $TiO_2$ and 24.5% Fe was heat-treated under reducing conditions at 600°, 900° and 950° C., and under oxidizing conditions at 950° C. All four materials, together with the untreated material were attacked with sulfuric acid in the conventional manner. The titanium conversions were as follows:

|  | Percent $TiO_2$ converted to soluble form |
|---|---|
| Control—untreated | 76 |
| Heated at 600° C. under reducing conditions | 75 |
| Heated at 900° C. under reducing conditions | 47 |
| Heated at 950° C. under reducing conditions | 47 |
| Heated at 950° C. under oxidizing conditions | 35 |

A further experiment was made with a sample of the same ilmenite in the unground form. A portion of it was reduced to ferrous at 700° C.,—the conversion of $TiO_2$ to soluble form by sulfuric acid was the same as with the unheated ore.

We are forced to conclude that the $TiO_2$ in ilmenite, when heated to temperatures above about 800° C., under oxidizing or reducing conditions, undergoes some physical or chemical change which renders it incapable in large measure of being solubilized by sulfuric acid. A logical explanation is that the $TiO_2$ has been transformed in part at least to the rutile crystal form, which is known to be practically incapable of reaction with sulfuric acid. Whether this or some other theoretical explanation is the true one, it is evident that herein lies the explanation of the failure of all ilmenite reduction processes involving reduction at 850° C. or higher—since no such process which yields less than a 50% conversion of $TiO_2$ to the soluble form can hope to be of practical significance.

It is also interesting to compare results by our novel process with those obtained with acids of the same concentrations but at lower temperatures. For instance, in a digestion of a reduced titanium-iron ore, in which substantially all of the iron was present in the ferrous state, at 110° C. with 40% sulfuric acid, only 45% of the FeO was dissolved and 21.7% of the $TiO_2$. We also digested similar reduced ilmenite in 5, 20, 35 and 50% sulfuric acid at the boiling point in open vessels using a large excess of acid.

The following results were obtained:

| Concentration of $H_2SO_4$ at start, percent | Percent FeO dissolved | Percent $TiO_2$ dissolved |
|---|---|---|
| 5 | 1.4 | 0.1 |
| 20 | 26 | 9 |
| 35 | 56 | 34 |
| 50 | 83 | 48 |

These results show that it is practically impossible to make a fair separation between titanium and iron at atmospheric pressure and at the boiling point of the dilute acid.

In respect to detailed preferred conditions relating to the second step of our novel process we have found the following conditions:

We have found it possible to use quite a range of acid concentrations, acid amounts and temperatures and pressures for separating the ferrous compounds from the titanium compounds in the reduced ore, and that, within certain limits, the concentrations and amount of acid which will secure the desired results will vary with the temperatures used.

Before proceeding with a description of the details of operations in our second step, we might give a few experiments illustrating the solubility of ferrous, ferric and titanium oxides as follows:

An ilmenite ore containing 60% $TiO_2$, 10.5% FeO and 23.5% $Fe_2O_3$ was digested in a closed vessel at different temperatures with different acid concentrations.

| Temp. of digestion, °C. | Time of digestion, hrs. | Concentration of $H_2SO_4$ at start, percent | Percent FeO dissolved | Percent $Fe_2O_3$ dissolved | Percent $TiO_2$ dissolved |
|---|---|---|---|---|---|
| 180 | 2 | 25 | 76 | 7 | 0.4 |
| 180 | 2 | 35 | 82 | 16 | 1.2 |
| 180 | 2 | 45 | 85 | 21 | 3.9 |
| 180 | 6 | 55 | 94 | 45 | 18.5 |
| 200 | 6 | 55 | 97 | 61 | 13.4 |

It will be noted from this table that up to 45% acid concentration and temperature of 180° C., a large amount of the ferrous iron was dissolved with little ferric iron and very little titanium. At higher acid concentrations both the ferric and ferrous iron were dissolved in large amounts and substantial amounts of titanium oxide were also dissolved. It will be realized that at such higher ferred conditions as hereinbefore stated, we do not intend to be limited thereby, particularly inasmuch as these will vary somewhat with the type of ore being used, its physical conditions, etc.

The digested residue containing the $TiO_2$ is then dissolved with a stronger acid. One procedure uses strong sulfuric acid which produces a titanium sulfate solution. The concentration of sulfuric acid necessary to solubilize the digested residue will in general, be in the same range and the attack effected under conditions similar to those which are required to dissolve the ferric compounds in the virgin titanium-iron ore: it may be desirable at this point to add a small quantity of reducing material such as iron to convert some of the titanium to the titanous state as is well known in the art. The titanium sulfate solution is then purified from colloidal muds and slimes in any preferred manner, such as filtration, coagulation and decantation, etc.

The purified or "clarified" solution may then be concentrated if desired, or hydrolyzed without concentration. The hydrolysate is filtered to obtain a filtrate containing usually about 15 to 25% $H_2SO_4$, and small amounts of Ti and Fe. The precipitated hydrated titanium dioxide is ready for further processing to produce pigment $TiO_2$ or other valuable and useful titanium compounds or pigments.

The filtrate from the hydrolysis is admirably suited for use as the weak extracting acid in our digestion step. In this manner, the acid is used, in effect, twice, and it is consequently not necessary to supply acid for all the iron in the original ore. We have, furthermore, found that the use of this weak filtrate will decrease the dissolution of the valuable titanium oxide in the digestion step, since it already contains slight but appreciable concentrations of dissolved Ti salts (in excess of 5 grams $TiO_2$ per liter). The solution of titanium in the digestion step appears to reach an equilibrium, so that when an acid containing small amounts of titanium salts is used, little or none of the titanium in the ore is dissolved.

The complete details of our novel process are shown more clearly in the attached flow-sheet. Ilmenite, either of rock variety crushed to about 50 or 100 mesh, or the sand variety in its natural state, is reduced to convert all the iron into the ferrous form. The reduced ore may be ground, or the original ore may be ground before reduction, or if a fairly fine sand such as is often times available is used, no grinding need be resorted to, although the increased yields obtained from the ground ore (200 mesh) usually warrant this step.

The reduced ore is then digested with weak acid at a pressure greater than atmospheric, under conditions of temperature, acid concentration and amount of acid as defined above. Any suitable type of equipment capable of withstanding pressures up to about 200#/in.² gauge resistant to the action of hot dilute acids, and with an agitating device, may be employed.

The resultant slurry of digested ilmenite and acid-ferrous sulfate solution is discharged at just below its boiling point and can be readily filtered.

The following examples will further illustrate our invention:

*Example I*

The titaniferous material used in this example was finely ground ilmenite containing 60% $TiO_2$ and 24.5% Fe, or expressing the iron content as FeO and $Fe_2O_3$, it was 10.5% and 23.5% respectively. This ore is typical of the class containing a large portion of its iron in the ferric form, the ordinary processing of which consequently entails considerable expense in reducing to the ferrous form. The reducing agent used was a standard commercial illuminating gas containing CO, $H_2$ and $CH_4$ as the active constituents.

The equipment in which the reduction was effected consisted of a large silica pot, the open end of which was fitted with a detachable cover through which there were holes for the admission of the reducing gas and the thermo-couple for temperature measurements. The entire pot with the exception of the open end was enclosed by an electric resistance furnace and the complete unit free to rotate.

In the operation, 1000 parts of the ground ore were placed in the pot, the cover fastened in place and the furnace started. Gas was kept flowing at a rate that would give an excess of reducing agents at all times. The gas leaving the furnace after contact with the hot ore was burned at the outlet. It was noticed that at around 530–580° C. the flame went out for a short time, after which it could be relighted and would continue burning. It was established that this period represented the conversion of the ferric iron to the ferrous, apparently taking place with great rapidity at this temperature.

The reduced ore was maintained at 600° C. for almost an hour to insure complete reduction, although the reaction appears to be completed in 15 minutes. The reduced mass was analyzed and found to contain 62.0% $TiO_2$ and 26.5% iron of which 98% was in the ferrous form.

The reduced ilmenite ore which now contained only small amounts of ferric iron was then treated with dilute sulfuric acid at a temperature of about 150° C. and corresponding pressure whereby the ferrous oxide was substantially completely dissolved, resulting in a solution of ferrous sulfate and a residue consisting of a titanium oxide with traces of ferric sulfate. This residue was then dissolved in stronger sulfuric acid of about 80% strength whereby a titanium sulfate solution was obtained which contained traces only of iron sulfates.

This solution was eminently suited for the recovery therefrom of hydrated titanium oxides by hydrolysis operations.

As these are well known in the arts and are no part of the invention need not be disclosed further.

*Example II*

The titaniferous material used in this example was Indian ilmenite sand, a fairly coarse natural product, being the same material as given for Example I, but without a preliminary fine grining. The ore contained 60% $TiO_2$ and 24.5% Fe of which 67% was in the ferric form. The reducing agent used was the same as in Example I.

The equipment in which the reduction was effected was a rotary kiln, consisting of one section of steel pipe, 6 feet long and 6 inches in diameter, joined by means of flanges at the discharge end to a second section of pipe, 4 feet long and 2 inches in diameter. The first portion was the reducing zone; the second served to cool the ore and at the same time preheat the incoming gas. The complete unit was mounted on suitable rollers and rotated slowly by an electric motor connected by a chain and sprocket drive. It was so arranged as to have an adjustable slope down towards the small or discharge end. This end was fitted with a stationary chamber for concentrations the selectivity of the action of the acid is considerably reduced.

The following experiments illustrate the selective dissolution of ferrous oxide and titanium dioxide in acids of various concentrations. A reduced titanium-iron ore, ilmenite, treated according to the above cited application was used. It contained 62% $TiO_2$ and 26% Fe substantially all of which was in the ferrous state.

| Temp. of digestion °C. | Concentration of $H_2SO_4$ at start, percent | Ratio of acid used to acid required for 100% E extraction | Percent dissolved | | $TiO_2/Fe$ in residue |
|---|---|---|---|---|---|
| | | | FeO | $TiO_2$ | |
| 200 | 50 | 4.0 | 95 | 1.3 | 47.0 |
| 180 | 25 | 1.6 | 88 | 0.2 | 19.6 |
| 150 | 25 | 1.5 | 70 | 0.3 | 7.7 |
| 135 | 25 | 2.0 | 82 | 0.5 | 13.0 |

It will be noted that under these conditions considerable amounts ranging from 70 to 95% of the iron in the ore was dissolved whereas a very small amount of titanium was dissolved. The ratio of $TiO_2$ to Fe was increased from 1.86 in the original ore to more than 7.5 in the solid residuum from the extraction. Any residue with a $TiO_2/Fe$ ratio greater than about 5 can be satisfactorily handled without subsequent removal of iron, as will later be explained in more detail.

It will be seen from the above results that it is practically impossible to make any appreciable separation between ferric iron and titanium. When, however, the major part of the iron in the ore is present in the ferrous state, as is possible thorugh our novel method we make a very valuable separation of iron and titanium.

The second step in our novel process is applicable to products which contain small amounts of ferric iron besides large amounts of ferrous iron, which small amounts of ferric iron remaining with the undissolved titanium are insufficient to interfere with the subsequent recovery of the titanium.

The lowest temperature necessary to give the desired dissolution of the ferrous compounds without substantially dissolving the titanium is dependent on the concentration of acid used, but is restricted by the fact that at the lower temperatures considerable quantities of $TiO_2$ are dissolved. The only upper temperature limit is determined by the resultant pressure and the strength of the digestion vessel used. The higher the temperature and pressure, the more efficient will be the extraction of iron, and the lower the extraction of $TiO_2$ at any given acid concentration. In general we have found it preferable to work at a temperature not higher than 200° C., which will produce a pressure below 200#/in.² with most solutions used. We are thereby enabled to use much less expensive equipment than would be required were much higher temperatures employed.

We have secured satisfactory results over the temperature range of 120° C. to 200° C., although higher temperatures can be used. At the particular acid concentrations which we prefer, temperatures between 135 and 180° C. are most satisfactory.

The lower limit of satisfactory acid concentrations is quite low. For instance, by using a temperature near the upper part of our preferred range (180° C.), we obtained satisfactory extractions by starting with a 10% $H_2SO_4$ solution. The upper limit of acid concentration is determined by the point at which $TiO_2$ is dissolved in appreciable amounts. At the higher temperatures this is around 50%; at the lower temperatures it is close to 40% $H_2SO_4$. In general we have found it preferable to use acid concentrations from about 15% to about 30% $H_2SO_4$, and from 3–15% in the case of hydrochloric acid.

The amount of acid used is also of considerable importance, particularly when, as in a commercial operation, one wishes to avoid overly long digestion times. We prefer to express the quantity of acid used as the ratio of the amount used to the amount necessary to convert all FeO present to $FeSO_4$. In two experiments comprising digestion of a reduced ilmenite with 25% $H_2SO_4$ at 180° C., we found 70% of the iron extracted with the above defined ratio, R=1.0, and 88% extraction with R=1.6.

We have successfully used amounts of acid corresponding to from R=0.7 to R=4.0, and in general prefer to stay within the lower part of this range,—i. e. from R=1.0 to R=2.0. From the standpoint of acid balance it is oftentimes preferable to use amounts of acid corresponding to as high as R=2.4, particularly when this amount of acid is available from the hydrolysis step. For instance, if a reduced Indian ilmenite sand containing 60% $TiO_2$ and 26% Fe present as FeO is used, and the titanium sulfate solutions contain 70% more $H_2SO_4$ than that necessary to combine with all the titanium as $TiOSO_4$ (and with all the iron), the amount of acid available for iron extraction will vary from 2.0 to 2.4 depending on the yields being obtained in the various operations. With an ilmenite containing only 53% $TiO_2$ and 35% Fe, and solutions of the same acidity, the available acid will be from R=1.3 to 1.6.

The time of digestion is not a crucial factor and will vary greatly with the temperature and pressure of digestion, concentration and amount of acid, amount of iron in ore, fineness of the ore, degree of agitation provided, etc. In usual practice, digestion times of several hours will suffice, although much longer periods may be necessary under severe conditions.

Although we prefer to submit to our novel pressure digestion step a ground reduced ore of around 150–200 mesh, we have found it possible to use ore in the natural sandy state, or crushed rock ore—at around 50 mesh. This will require, in general, more severe conditions—i. e. higher temperatures and concentrations, or more acid. For instance, for digestion of a ground ore at 150° C. and 25% $H_2SO_4$, an amount of acid equivalent to R=1.0 will suffice to give a $TiO_2/Fe$ ratio in the extracted ore of 7.3, but with the unground ore, twice as much acid (R=2.0) is necessary. Similarly at 180° C. and 25% $H_2SO_4$, 1½ times as much acid (R=1.5) gave a comparable iron extraction.

We have found it possible to increase the extraction by the use of small amounts of hydrofluoric acid (about 1 to 3% of the $H_2SO_4$), introduced for instance as the calcium fluoride, $CaF_2$. The improvement is, however, relatively small, and in general the resultant corrosion problems may not warrant the use.

It is also possible to use dilute hydrochloric acid for the digestion, and to follow this with the solubilizing attack step using strong hydrochloric acid, or strong sulfuric acid. Similarly, when dilute sulfuric acid is used in the extracting medium, either strong hydrochloric or strong sulfuric acid can be used in the attack step.

It will be understood that in defining our prematerial discharge and for the admission of the cold gas. The large or feed end was equipped with a hopper for the constant rate feed of ilmenite and also with a hood for the disposal of the used gases. Under the reducing section external heat was supplied by a gas flame.

In the operation, the ilmenite flow was about 7.9 pounds per hour, said flow being maintained constant by the ilmenite feed and slope of the kiln. The gas flow was somewhat in excess of that theoretically required to completely reduce the iron from the ferric to the ferrous form.

The flow of ore, as determined by the slope of the furnace and rate of rotation, and the heat supplied were so regulated as to maintain an average temperature of 600° C. over two linear feet of the reduction section. The ore took less than 1½ hours to pass through this section. Through the first 3 feet of the reducing section the ore was being heated, through the last foot and the entire length of the cooling section it was being cooled and the gas pre-heated.

The system required 5 hours to reach equilibrium after which it discharged a reduced ore with 100% of the iron in the ferrous form.

The reduced ore was attacked with dilute $H_2SO_4$ under pressure as explained above and a solution of ferrous sulfate and an insoluble residue of titanium oxide obtained which was treated with a stronger sulfuric acid and a solution of titanium sulfate obtained which contained only small amounts of iron.

*Example III*

The continuous rotary kiln described in Example II was slightly modified to give an ore flow of 21 pounds per hour by increasing the slope to 0.05 foot per linear foot and the rate of rotation to a little less than 4 R. P. M. The kiln was operated with a reducing zone of 3 feet maintained at an average maximum temperature of 565° C. The same reducing agent as in Example II was used with the flow regulated at about 1 cu. ft./min. (at room temperature). There was produced in 30 hours 635# of reduced ore containing substantially all of its iron in the reduced form, with substantially no metallic iron. The reduced ore was then treated with dilute sulfuric acid at about 180° C. whereby the ferrous compounds were extracted leaving a residue of a titanium oxide which was easily soluble in more concentrated acid.

By specifying, herein before, the conditions and materials with which we obtained good results in the process of our invention, we do not mean to imply that our invention is thereby limited to these particular conditions and materials. We can employ various conditions and materials over quite a wide range.

Any active reducing agent in the gaseous, liquid or solid form, may be employed, although we have obtained somewhat more satisfactory results with gaseous reducing agents such as hydrogen, carbon monoxide, and the lower hydrocarbons or mixtures thereof. Economical use of a gaseous reducing agent may be obtained by using it first in some excess for reduction, and then burning the unreacted gas to supply the necessary heat. Conversely heat may be supplied by the incomplete combustion of an atomized liquid or gaseous fuel, and the resultant gases, rich in reducing gases, such as carbon monoxide, used for the reduction. Such liquid and solid reducing agents as light oil, petroleum coke, coal and sulfur can also be used.

Although we have described in some detail one type of externally fired rotary kiln which we have found to be satisfactory, any of the conventional types of reducing furnaces, such as horizontal internally fired, vertical, Herreshof, Wedge, ore roasters, etc., all of which would produce comparable results, could be used.

We have found the optimum temperature for reduction to be between 550° C. and 650° C. However, with other reducing agents, such as coal, we have found it necessary to go to somewhat higher temperatures. The reduction of the ferric iron to the ferrous form can be effected between 500° C. and 800° C. depending upon the reducing agent used and the desired characteristics of the reduced ilmenite to be obtained.

While we have described the utilization of the reduced titanium-iron ore by solubilizing the ferrous compounds therein with dilute sulfuric acid at elevated temperature, it will be understood that any inorganic acid capable of reaction with titanium and ferrous oxides, under any desired conditions such as hydrochloric, hydrofluoric acids, and strong sulfuric acid could be used with advantage for the production of solutions containing titanium compounds. These advantages result, in fact, when the titanium and iron oxides are converted to any soluble salts suitable for any desired subsequent operation.

We claim:

1. In a process of treating a ferruginous-titanium ore containing iron in the ferric state, the steps of treating said ore, while free from a fluxing agent and maintained in substantially unchanged physical state, at a temperature of between about 500–800° C. with a reducing agent, whereby ferric compounds in said ore are reduced to the ferrous state only and without formation of metallic iron, and then dissolving in acid the so-produced ferrous compounds.

2. In a process of treating a ferruginous titanium ore containing iron in the ferric state, the steps of treating said ore at a temperature of between about 550 and 800° C. while maintaining the same in substantially physically unchanged state with a reducing agent, whereby ferric compounds in said ore are reduced to ferrous compounds only, without formation of metallic iron, and then digesting said reduced ore with a dilute aqueous solution of a strong mineral acid at a temperature not less than substantially 120° C., and at a pressure substantially greater than atmospheric to dissolve preferentially the ferrous compounds so produced.

3. In a process of treating a ferruginous titanium material which contains iron in the ferric state, comprising treating said ore while free from a fluxing agent and maintained in substantially physically unchanged state, at a temperature from between about 550 and 800° C. with a reducing agent, whereby ferric compounds in said ore are reduced to ferrous compounds only, without formation of metallic iron, and then treating the reduced ore with a strong mineral acid and recovering its titanium values.

4. The process of claim 2 in which the reducing agent is selected from the group consisting of hydrogen and carbonaceous reducing agents.

5. The process of claim 2 in which the reducing agent is a carbonaceous fuel.

6. The process of claim 2 in which the strong mineral acid is selected from the group of acids consisting of sulfuric and hydrochloric acids.

7. The process of claim 2 in which the aqueous solution of said strong mineral acid contains at the start of the digestion between about 10% and about 50% $H_2SO_4$.

8. The process of claim 2 in which the aqueous solution of said strong mineral acid contains at the start of the digestion between about 3% and 15% HCl.

9. The process of claim 2 in which the reduced ore is digested at a temperature between 120 and 200° C.

10. In a process of treating a ferruginous-titanium ore containing iron in the ferric state the steps of treating said ore at a temperature of between 550 and 650° C. and while maintaining the same in undissolved state with a gaseous reducing agent selected from the group of agents consisting of hydrogen and carbonaceous fuels whereby ferric compounds in said ore are reduced to ferrous compounds only, without formation of metallic iron and subsequently digesting said reduced ore with a dilute aqueous solution of a strong mineral acid at a temperature between about 135 and 180° C. and at a pressure greater than atmospheric.

11. The process of claim 10 in which said strong mineral acid used in dilute aqueous solution is sulfuric acid and in which it is present at the start of the digestion in an amount from about 70% to about 400% of that necessary to convert all ferrous compounds in said reduced ore to ferrous sulfate.

12. The process of claim 10 in which said strong mineral acid used in dilute aqueous solution is sulfuric acid and in which it is present at the start of the digestion in an amount from about 100% to about 200% of that necessary to convert all ferrous compounds in said reduced ore to ferrous sulfate.

13. In a process of treating a ferruginous-titanium ore containing iron in the ferric state the steps of treating said ore at a temperature of between 550 and 650° C. and while maintaining the same in undissolved state with a gaseous reducing agent selected from the group of agents consisting of hydrogen and carbonaceous fuels whereby ferric compounds in said ore are reduced to ferrous compounds only, without formation of metallic iron and subsequently digesting said reduced ore at super atmospheric pressure and at a temperature between about 135 and 180° C. in a dilute acid selected from the group consisting of sulfuric acid of a concentration between 15 and 50% and hydrochloric acid of a concentration between 3 and 15%.

14. In a process of recovering titanium values from a ferruginous-titanium ore containing iron in the ferric state the steps of treating said ore at a temperature of between about 550 and 800° C., while maintaining the same in physically unchanged state with a gaseous reducing agent selected from the group consisting of hydrogen and a carbonaceous fuel, whereby ferric compounds in said ore are reduced to ferrous compounds only, without formation of metallic iron, subsequently digesting said reduced ore with a dilute aqueous solution of a strong mineral acid at a temperature ranging substantially from 120° C. to 200° C. and at a pressure substantially greater than atmospheric, whereby ferrous compounds are preferentially dissolved and a solution of the ferrous compounds and an insoluble residue containing the titanium values are obtained, dissolving the titanium values in said residue in an acid of a concentration greater than the acid concentration of the solution used in the digestion step.

15. In a process of recovering titanium values from a ferruginous-titanium ore containing iron in the ferric state and in which an acid is used to dissolve titanium values, said acid being subsequently recovered and used to dissolve iron values in the ore, the steps of treating said ore while maintaining the same in physically unchanged state at a temperature of about 550 to 800° C. with a gaseous reducing agent selected from the group consisting of hydrogen and a carbonaceous fuel, whereby ferric compounds in said ore are reduced to ferrous compounds only, without formation of metallic iron, subsequently digesting said reduced ore with a dilute aqueous solution of a strong mineral acid at a temperature range of substantially 120° C. to 200° C. and at a pressure substantially greater than atmospheric, whereby said ferrous compounds are preferentially dissolved and a solution of the ferrous compounds and an insoluble residue containing the titanium values are obtained, separating said insoluble residue from said solution of ferrous compounds, dissolving the titanium values in said residue in an acid of a concentration greater than the acid concentration of the solution used in the digestion step, whereby a solution of a titanium salt is obtained, heating said solution of said titanium values to hydrolyze said soluble titanium compounds, whereby a hydrated titanium oxide is precipitated and a dilute acid recovered, and using said dilute acid in the digestion of a reduced ferruginous-titanium ore as obtained in the first step of the process.

16. In a process of treating a ferruginous-titanium ore containing iron in the ferric state, the steps of first reducing the ferric values in said ore to ferrous compounds only, by subjecting said ore to heat treatment at a temperature below 800° C. in the presence of a gaseous reducing agent, during said reduction maintaining the titanium and iron values in said ore in physically unchanged state, and subsequently preferentially dissolving said ferrous compounds by digesting the reduced comprising substantially a ferrous oxide-titanium oxide composition with a dilute aqueous solution of a strong mineral acid at a temperature not less than substantially 120° C. and not greater than about 200° C. under a pressure substantially greater than atmospheric.

17. A process for concentrating and recovering the titanium values present in a ferruginous-titanium ore wherein iron is present in the ferric state, comprising initially subjecting said ores while maintaining the same in physically unchanged state to a temperature ranging substantially from 550° C. to 800° C. in the presence of a gaseous reducing agent, the latter being passed countercurrent to the ore under treatment, whereby said ferric iron values are converted to ferrous compounds only and a titanium oxide-ferrous oxide composition results, preferentially dissolving said ferrous compounds in a dilute aqueous solution of a strong mineral acid at a temperature of 120–200° C. and under a pressure substantially greater than atmospheric, and thence separating the insoluble titanium values from the dissolved ferrous compounds.

18. In a process of treating a ferruginous-titanium ore containing iron in the ferric state, the steps of treating said ore at a temperature of between about 550–800° C., and while maintaining the same in substantially unchanged physical state, with a reducing agent, whereby ferric compounds in said ore are reduced to the ferrous state only, without formation of metallic iron, and then subjecting said reduced ore to treatment with a mineral acid at such strength and under such conditions of temperature and pressure as to preferentially dissolve the ferrous compounds so produced.

19. A process for treating ferruginous-titanium ore containing iron in the ferric state, comprising treating said ore with a reducing agent at a temperature of between about 500–800° C., in the absence of substantial amounts of a fluxing agent and while maintaining the ore in substantially physically unchanged state, whereby the ferric compounds in said ore are reduced to the ferrous state only without formation of metallic iron, and then dissolving in acid the resulting ferrous compounds.

DAVID H. DAWSON.
IGNACE J. KRCHMA.
ROBERT M. McKINNEY.

CERTIFICATE OF CORRECTION.

Patent No. 2,127,247.    August 16, 1938.

DAVID H. DAWSON, ET AL.

It is hereby certified that error appears in the printed specification of the above numbered patent requiring correction as follows: Page 2, second column, line 13, beginning with the words "It is also interesting" strike out all to and including the words and period "temperatures used." in line 48, and insert the same before the paragraph beginning with "The lowest temperature", page 3, first column, line 44; page 4, second column, line 58, for "grining" read grinding; page 5, first column, line 17, for the word "reduction" read reducing; page 6, second column, line 29, claim 15, for "oxids" read oxide; line 44, claim 16, after "reduced" insert ore; and that the said Letters Patent should be read with this correction therein that the same may conform to the record of the case in the Patent Office.

Signed and sealed this 1st day of November, A. D. 1938.

Henry Van Arsdale (Seal)    Acting Commissioner of Patents.

subjecting said reduced ore to treatment with a mineral acid at such strength and under such conditions of temperature and pressure as to preferentially dissolve the ferrous compounds so produced.

19. A process for treating ferruginous-titanium ore containing iron in the ferric state, comprising treating said ore with a reducing agent at a temperature of between about 500–800° C., in the absence of substantial amounts of a fluxing agent and while maintaining the ore in substantially physically unchanged state, whereby the ferric compounds in said ore are reduced to the ferrous state only without formation of metallic iron, and then dissolving in acid the resulting ferrous compounds.

DAVID H. DAWSON.
IGNACE J. KRCHMA.
ROBERT M. McKINNEY.

CERTIFICATE OF CORRECTION.

Patent No. 2,127,247. August 16, 1938.

DAVID H. DAWSON, ET AL.

It is hereby certified that error appears in the printed specification of the above numbered patent requiring correction as follows: Page 2, second column, line 13, beginning with the words "It is also interesting" strike out all to and including the words and period "temperatures used." in line 48, and insert the same before the paragraph beginning with "The lowest temperature", page 3, first column, line 44; page 4, second column, line 58, for "grining" read grinding; page 5, first column, line 17, for the word "reduction" read reducing; page 6, second column, line 29, claim 15, for "oxids" read oxide; line 44, claim 16, after "reduced" insert ore; and that the said Letters Patent should be read with this correction therein that the same may conform to the record of the case in the Patent Office.

Signed and sealed this 1st day of November, A. D. 1938.

Henry Van Arsdale (Seal) Acting Commissioner of Patents.